(12) United States Patent
Merlet et al.

(10) Patent No.: US 8,794,095 B2
(45) Date of Patent: Aug. 5, 2014

(54) ROTOLINEAR ACTUATOR WITH SATELLITE ROLLERS

(75) Inventors: Etienne Merlet, Paris (FR); Jean-Eric Besold, Paris (FR); Marie-Noëlle Raymonde Agathe Besold, legal representative, Saclay (FR); Jean-François Weibel, Paris (FR)

(73) Assignee: Sagem Defense Securite, Paris (FR)

( * ) Notice: Subject to any disclaimer, the term of this patent is extended or adjusted under 35 U.S.C. 154(b) by 910 days.

(21) Appl. No.: 12/809,339

(22) PCT Filed: Dec. 17, 2008

(86) PCT No.: PCT/FR2008/052334
§ 371 (c)(1),
(2), (4) Date: Jun. 18, 2010

(87) PCT Pub. No.: WO2009/081034
PCT Pub. Date: Jul. 2, 2009

(65) Prior Publication Data
US 2010/0269616 A1    Oct. 28, 2010

(30) Foreign Application Priority Data
Dec. 19, 2007 (FR) ...................... 07 59975

(51) Int. Cl.
*F16H 25/22* (2006.01)

(52) U.S. Cl.
USPC .................. 74/424.92; 74/89.44

(58) Field of Classification Search
USPC ............. 74/424.91, 424.92, 89.44, 424.89; 475/159, 331, 165, 168; 384/469, 553
See application file for complete search history.

(56) References Cited

U.S. PATENT DOCUMENTS

| 3,331,469 A | | 7/1967 | Deflandre |
| 3,425,759 A | * | 2/1969 | Schwarzschild ............ 384/491 |
| 3,454,136 A | | 7/1969 | Stark |
| 3,508,452 A | * | 4/1970 | Roantree .................... 74/424.7 |

(Continued)

FOREIGN PATENT DOCUMENTS

| DE | 28 21 726 | 5/1978 |
| FR | 1 577 532 | 8/1969 |
| JP | 11063386 A | 3/1999 |

OTHER PUBLICATIONS

French Search Report for priority application No. FR 07 59975; Report dated Aug. 14, 2008.

(Continued)

*Primary Examiner* — David M Fenstermacher
*Assistant Examiner* — Terence Boes
(74) *Attorney, Agent, or Firm* — Miller, Matthias & Hull LLP

(57) ABSTRACT

The invention relates to a rotolinear actuator that comprises: a central rod having an outer thread and surrounded by a ring with an inner thread, and threaded satellite rollers distributed between the central rod and the outer ring engaged with the threaded faces thereof. The actuator includes means for dispensing by capillarity a liquid lubricant at least one contact area of at least one satellite roller with the central rod and with the outer ring, wherein the lubricant is economically dispensed by capillarity in an amount that is just sufficient and precisely at the contact locations of the interacting members, from a tank that may be sufficient for the lifetime of the actuator.

13 Claims, 10 Drawing Sheets

(56) References Cited

U.S. PATENT DOCUMENTS 3,595,094 A     7/1971   Lemor
3,861,221 A * 1/1975   Stanley .............................. 74/25
4,846,007 A * 7/1989   Weyer ........................ 74/424.92
5,370,012 A * 12/1994 Stanley ...................... 74/424.92

OTHER PUBLICATIONS

International Search Report for related international application No. PCT/FR2008/052334, report dated Jun. 29, 2009.

* cited by examiner

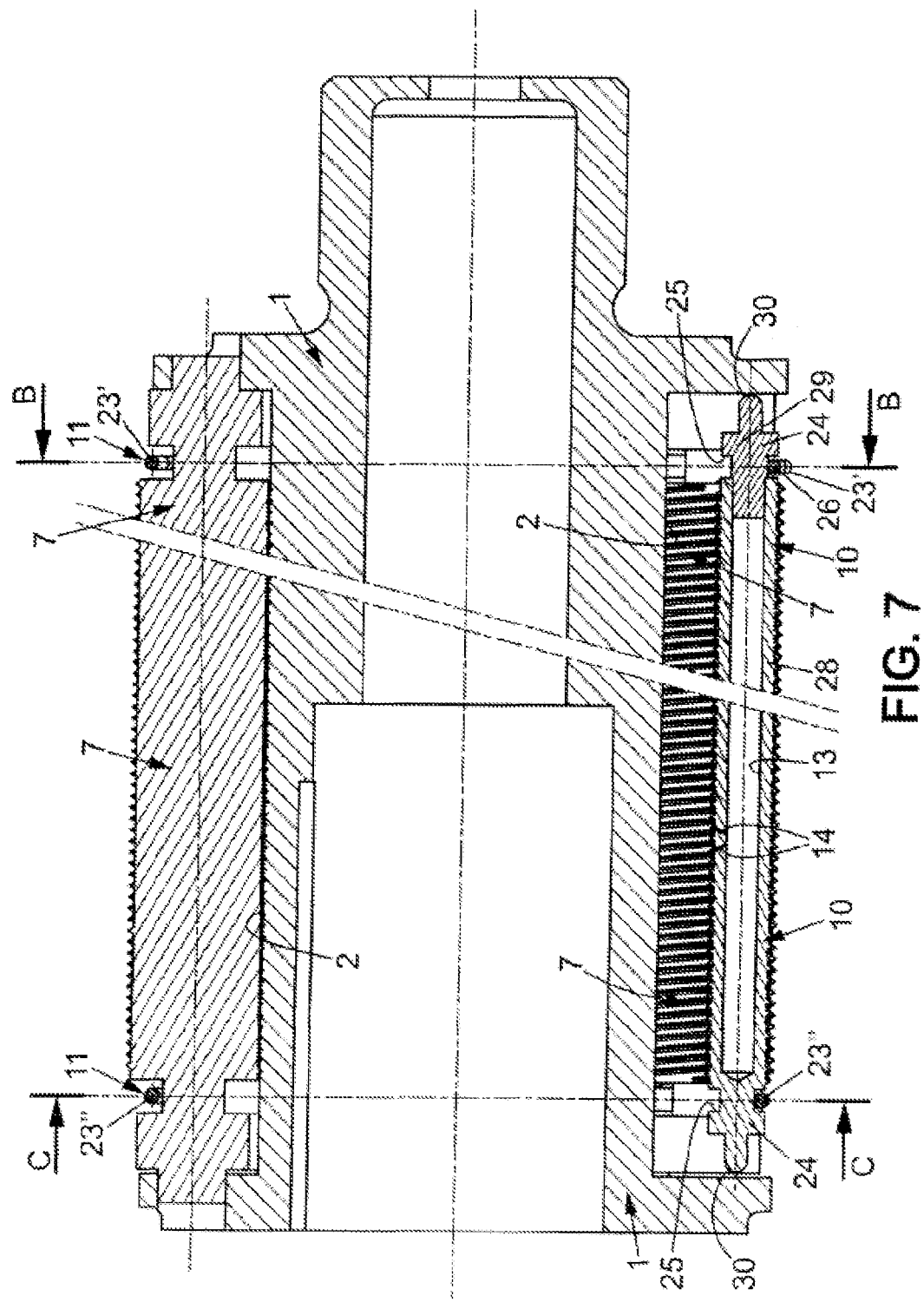

ROTOLINEAR ACTUATOR WITH SATELLITE ROLLERS

CROSS-REFERENCE TO RELATED APPLICATIONS

This application is a U.S. national stage filing under 35 USC §371 of International Patent Application No. PCT/FR2008/052334 filed on Dec. 17, 2008, which claims priority under the Paris Convention to the French Patent Application No. 07 59975, filed on Dec. 19, 2007.

FIELD OF THE DISCLOSURE

The present invention relates to improvements made to rotolinear actuators of the type comprising:
a central rod having a threaded outer face,
an outer ring surrounding said central rod substantially coaxially and having a threaded inner face, and
a plurality of threaded satellite rollers distributed circumferentially between said outer face of the central rod and said inner face of the outer ring and which are engaged with the threaded faces of the central rod and the outer ring,
one of the central rod and the outer ring being capable of rotating and axially secured while the other respectively the outer ring or the central rod is secured in rotation and capable of being axially displaced.

BACKGROUND OF THE DISCLOSURE

Such an actuator with satellite rollers is disclosed in particular in document FR 1 577 532.

In the field of ball or roller screws, it is known to apply a lubricant (oil, grease, solid lubricant), in order to improve the tribological characteristics thereof. This can involve an external application (for oil and grease in particular) or also the deposition (in particular on the screw) of a surface coating capable, through its wear, of progressively releasing solid lubricant particles. A solution is also known that makes use of self-lubricating intercalated bearings arranged between the balls or rollers.

With regard to rotolinear actuators with satellite rollers, if the intercalated bearings solution is not technically feasible, the solution of the application of an external lubricant (oil, grease) remains possible, and a solution consisting of forming a solid lubricant coating on the roller screws is also known.

However, these various solutions currently employed require the lubricant or the lubrication member to be replaced regularly, at intervals which can be longer or shorter but never cover the estimated lifetime of the actuator, and in particular, said replacement requires that the actuator be accessible.

These conditions cannot be fulfilled in certain fields of application of the actuators, as is the case in particular with electrical actuators for aircraft flight controls, the maintenance-free lifetime of which must cover the lifetime of the aircraft.

With regard to specific application to the electrical actuation of aircraft flight controls, the actuator requires a low rotation/translation ratio, hard and rigid constituent materials due to high contact pressures, as little friction as possible, and lifetime lubrication (i.e. for several tens of years); moreover, for safety reasons, the actuator must be reversible. These demands lead to the use of rotolinear actuators with screws having lubricated satellite rollers, in the knowledge that using a dry lubricant deposited on the screw and the techniques of progressive wear of operational parts cannot be envisaged due to the formation of residual particles that could result in seizing of the actuator, and that splash lubrication is undesirable and would be impractical to implement and unlikely to cover such a long period of time.

The purpose of the invention is therefore to propose an original technical solution capable of meeting the practical requirements with regard to the demands for long-term homogenous lubrication.

SUMMARY OF THE DISCLOSURE

To this end, the invention proposes a rotolinear actuator with satellite rollers of the type disclosed in the preamble, which when arranged according to the invention is characterized by the provisions stated in the characterizing section of claim 1.

By means of the technical solution according to the invention, the lubricant is distributed economically by capillarity from a store, in a quantity that is just sufficient, precisely to the contact locations of the interacting members, such that said store, although having a very low volume, is sufficient for the lifetime of the actuator, even if said lifetime is very long (for example estimated at several tens of years).

A useful advantage of these provisions resides in their considerable potential for adaptation according to the lubricant requirements, which themselves depend on the operating modes required for the actuator. The lubricant requirements on the one hand, and the manner in which the lubricant is distributed over the components on the other hand, depend largely on the operating conditions of the actuator with a greater or lesser stroke depending on the application. For certain applications, the operating conditions of a single actuator can possibly be highly variable over time: by way of example, the drive actuators of the moving flaps of the wings of an aeroplane have long strokes during takeoff and landing when the wing flaps have large amplitude movements, while they do not work, or only work a little with very short strokes corresponding to very small angular displacement (a few degrees), during stable flight when the flaps remain immobile or almost immobile.

In these conditions, the flexibility of arrangement allowed by implementation of the invention makes it possible to design an arrangement according to the operating conditions normally expected for the actuator.

Thus it is possible to arrange for the means for distribution by capillarity of a liquid lubricant to be provided in order to distribute the lubricant at a single contact area of at least one satellite roller with the central rod and the outer ring, said area being preferably centrally located, when the actuator is called upon to have essentially large amplitude movements resulting in complete and even lubrication of the parts required to be in contact.

However, in a useful embodiment suitable for covering a large number of conditions of use, it can be arranged for the means for distribution by capillarity of a liquid lubricant to be provided in order to distribute the lubricant at least two contact areas of at least one satellite roller with the central rod and the outer ring, said two areas being located respectively close to the two ends of said satellite roller. In particular it can be envisaged, if the lubricant requirements are lower, that the means for distribution by capillarity of a liquid lubricant are provided in order to distribute the lubricant at a plurality of contact areas of at least one satellite roller with the central rod and the outer ring, said plurality of contact areas being distributed, preferably substantially evenly, over substantially the whole length of said satellite roller. More specifically, in the case where the lubricant requirements are high, it can be envisaged that the means for distribution by capillarity of a liquid lubricant are provided in order to distribute the lubricant at all the contact areas of at least one satellite roller with the central rod and the outer ring.

It can certainly be envisaged that the means for distribution by capillarity of a liquid lubricant are functionally associated with a single satellite roller if the lubrication conditions thus obtained are consistent with the operating conditions of the actuator. However, it appears that, at least for a large number of applications, it is necessary to provide for the means for distribution by capillarity of a liquid lubricant to be functionally associated with several satellite rollers, in particular distributed symmetrically, or even, if the lubricant requirements are high, for said means for distribution by capillarity of a liquid lubricant to be functionally associated with all the satellite rollers.

The practical implementation of the provisions of the invention can lead to several possible embodiments.

Thus, in a first embodiment, it is provided that the means for distribution by capillarity of a liquid lubricant are incorporated into at least one satellite roller. It can certainly then be envisaged, in the case of an actuator having large amplitude strokes in normal operation, for a single satellite roller to be equipped with said means for distribution by capillarity of a liquid lubricant. However, it appears that at least for a majority of applications of said actuators, it is necessary to envisage that the means for distribution by capillarity of a liquid lubricant are incorporated into several satellite rollers, in particular distributed symmetrically, if the lubricant requirements are lower; or it can even prove necessary for the means for distribution by capillarity of a liquid lubricant to be incorporated into all the satellite rollers if the lubricant requirements are high.

In a further useful embodiment, the means for distribution by capillarity of a liquid lubricant are incorporated into at least one auxiliary roller arranged in contact with at least one satellite roller, while being radially external to the latter, and in that flexible retaining means are provided in order to pull said auxiliary roller substantially radially inwards in contact with said satellite roller. However, a solution that is technically simpler to implement and has more effective results consists in that the at least one auxiliary roller is arranged in contact simultaneously with two adjacent satellite rollers, while being radially external thereto, and in that the flexible retaining means are provided in order to pull said auxiliary roller substantially radially inwards in contact with the two satellite rollers. Whatever configuration is used, a single auxiliary roller can certainly be provided, kept in contact with a single satellite roller if the lubrication conditions thus obtained satisfy the requirements in relation to the operating modes of the actuator. However, it appears that in a majority of applications it is necessary to provide several auxiliary rollers, in particular distributed symmetrically and, particularly if the lubricant requirement is high, since there is an even number of satellite rollers, an auxiliary roller can be provided that is functionally associated with each pair of satellite rollers. It can also be envisaged for the satellite rollers to be equal in number to the auxiliary rollers, each of the auxiliary rollers being functionally associated with a pair of satellite rollers, a solution which allows for a maximum quantity of lubricant to be stored.

Several technical solutions can be envisaged for the specific realization of these provisions, which call for a particular arrangement of the rollers and dispense with the need for a lubricant reservoir external to the rollers.

According to a first possible embodiment, the means for distribution by capillarity of a liquid lubricant comprise a macroscopic reservoir provided internally with a satellite and/or auxiliary roller, said reservoir comprising at least one inner cavity, especially having an elongated shape in particular substantially coaxial to the axis of said roller, and at least one capillary channel extending from said cavity and opening onto at least one thread flank of said roller. In this example, the satellite and/or auxiliary roller, which is arranged for the distribution of the lubricant, is machined so as to have the abovementioned cavity(ies) and channel or channels.

According to a second possible embodiment, the satellite and/or auxiliary roller is constituted from a very porous material and the means for distribution by capillarity of a liquid lubricant comprise a capillary reservoir formed by the pores of said very porous material constituting said roller. In this case, the composition of the lubricant reservoir is inherent to the composition of the roller itself.

Whatever the embodiment used, the structure of the whole remains compact due to the incorporation of the lubricant store in the roller concerned.

The choice of oil is left to the know-how in use for satellite roller screws, and is only affected by the invention insofar as its viscosity must be suitable for the size of the cavity(ies) and channel or channels in order to benefit from the capillarity effect. Preferably, if the operational requirement requires the use of an additive with the lubricant, the latter is an oil with a diluted additive which on the one hand, overcomes the drawbacks of the additives in suspension in a liquid and the particles released by solid lubricants (risks of seizing) and which on the other hand, allows for the storage and transport of the lubricant by capillarity without the risk of it becoming denatured. Moreover, such a lubricant having a diluted additive lends itself particularly to the ability to be distributed in a very targeted manner to the particular desired location, in this case on the thread flanks at the interfaces between the screw of the satellite roller(s) and the screw of the central rod, on the one hand, and between the screw of the satellite roller(s) and the screw of the outer ring, on the other hand. However, within the context of the invention the possibility of using lubricants with additives in suspension is not ruled out if this proves necessary or useful; the particles of additive in suspension must then have a size substantially smaller than the dimension of the cavities or capillary channels.

The use of capillarity lends itself remarkably well to accurate distribution, with the further advantage, equally remarkable and essential in the context envisaged, that the lubricant is dispensed only when necessary, all of these arrangements leading to an economical distribution suitable for providing lubrication over a very long period.

All of these features lead to the production of a rotolinear actuator, in particular of the reversible type, with satellite rollers, which is lubricated for a very long period which, in the context of specific applications, must be capable of reaching several tens of years.

BRIEF DESCRIPTION OF THE DRAWINGS

The invention will be better understood on reading the following detailed description of certain embodiments given solely by way of non-limitative examples. In the description, reference is made to the attached drawings, in which:

FIG. 7 shows, grouped into a single illustration, two views in diametrical sections showing respectively two variants (respectively on the right and left parts of the illustration) of a specific embodiment of a rotolinear actuator (outer ring removed) arranged according to the invention with a combination of the provisions in FIGS. 3E, 5A, 4B (for the right part) and 4C (for the left part).

DETAILED DESCRIPTION OF THE DISCLOSURE

Figure 1A:
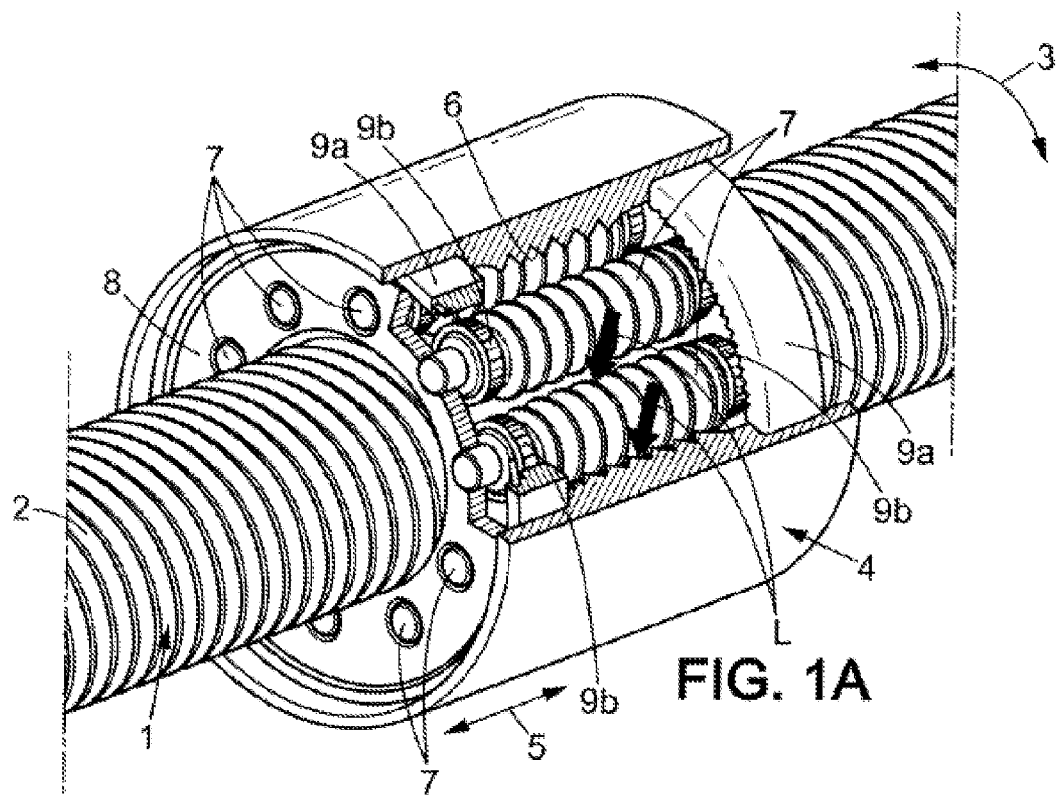
FIGS. 1A to 1C are perspective views with partial cutaway of a rotolinear actuator with satellite rollers on which a fundamental aspect of the provisions of the invention has been highlighted respectively in three examples of different configurations.

Reference is made firstly to FIG. 1A, showing a perspective view of a rotolinear actuator with partial cutaway, in particular reversible, of the type to which the invention relates. Briefly, it will be recalled that such an actuator includes:

a central rod 1 having a threaded outer face 2;

an outer ring 4 substantially coaxially surrounding said central rod 1 and having a threaded inner face 6; and a plurality of threaded satellite rollers 7 distributed circumferentially between said outer face 2 of the central rod 1 and said inner face 6 of the outer ring 4; the satellite rollers 7 are engaged with the threaded faces 2, 6 respectively of the central rod 1 and the outer ring 4, and the threads of the outer face 2, the inner face 6 and the rollers have the same pitch and the same lead angle.

The satellite rollers 7 are held in a cage formed by two annular flanges 8, surrounding the central rod 1 and separated from each other axially; these flanges are pierced by angularly distributed holes forming bearings in which the respective ends of the satellite rollers 7 turn.

Against at least one of the flanges 8 an annular ring gear 9a is provided, toothed on its inward face, forming an annular rack with which engage pinions 9b provided at the corresponding end of the satellite rollers 7; in the example shown, two toothed ring gears 9a are provided, with which engage two pinions 9b provided respectively at the two ends of each of the satellite rollers 7.

In the example shown in FIG. 1A, it is assumed that the actuator is arranged conventionally with the central rod 1 axially secured, but capable of rotating (double arrow 3) while being driven in rotation by means that are not shown, and with the outer ring 4 secured in rotation, but capable of sliding axially (double arrow 5) under the drive action of the rotary rod 1; the actuator being more particularly assumed to be reversible, a mechanical force exerted on the ring 4 approximately parallel to the axis of the actuator causes the central rod 1 to be rotated. But a reverse arrangement of the actuator (ring 4 driven in rotation and central rod 1 sliding axially) can also be envisaged in the context of the implementation of the invention.

According to the invention, provision is made for the actuator to include means for distribution by capillarity of a liquid lubricant that are functionally associated with at least one satellite roller 7 for distribution by capillarity of a liquid lubricant L at least one contact area of said at least one satellite roller 7 with the central rod 1 (not visible in FIG. 1A) and with the outer ring 4 as shown diagrammatically by the two arrows L in FIG. 1A.

The liquid lubricant distributed by capillarity is dispensed in a quantity that is just sufficient, precisely to the contact locations of the interacting components only: satellite roller 7 and central rod 1, on the one hand, and satellite roller 7 and outer ring 4, on the other hand. Such distribution is therefore economical and even a low-volume liquid lubricant store can be sufficient in order to ensure the lubrication required over a very long period capable of covering the expected lifetime of the actuator (for example several tens of years for aircraft flight control actuators).

In the case of actuators consistently having long strokes of travel, in particular maximum or almost maximum, it is possible to envisage the distribution by capillarity of liquid lubricant only in a single contact area of the satellite roller 7 respectively with the central rod 1 and the outer ring 4 as in the case shown diagrammatically in FIG. 1A, the lubricant being distributed approximately homogenously over the whole length of the interacting surfaces during the relative movements of the components.

Conversely, if the actuator does not consistently have long strokes, in particular maximum, it is desirable to distribute the lubricant in an approximately homogenous manner over the whole length of the interacting surfaces by multiplying the distribution points. Thus, it can be arranged that the means for distribution by capillarity of a liquid lubricant are provided in order to distribute the lubricant at least two contact areas of at least one satellite roller 7 with respectively the central rod 1 and the outer ring 4, said two areas being located respectively close to the two ends of the satellite roller 7 as shown diagrammatically in FIG. 1B by the two arrows L (FIG. 1B being otherwise identical to FIG. 1A and the same numerical references denoting the same elements therein).

Figure 1B:
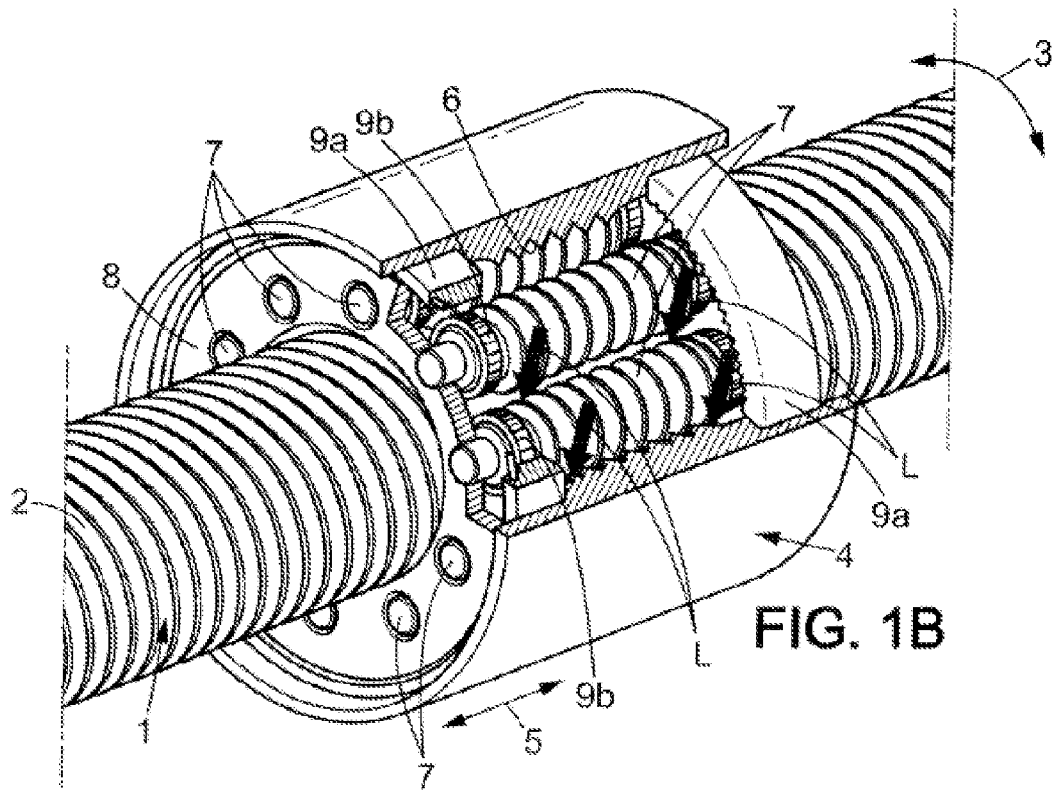
Figure 1C:
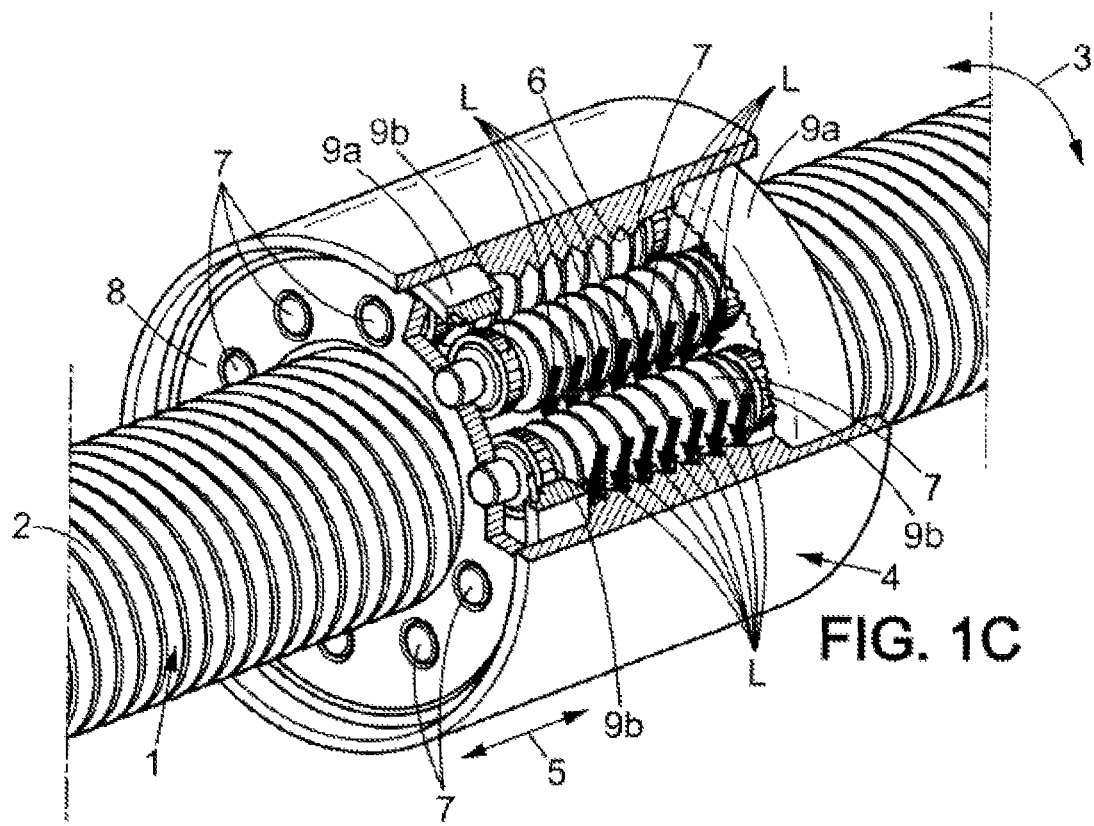

In the case where yet more even lubrication is desired, for example in order to compensate for an insufficient lubricant feed due to the low amplitude movements of the actuator and/or to high loads, it is preferable that the means for distribution by capillarity of a liquid lubricant are provided in order to distribute the lubricant at a plurality of contact areas of at least one satellite roller 7 respectively with the central rod 1 and the outer ring 4; said plurality of contact areas is distributed, preferably evenly, over substantially the whole length of the satellite roller 7 as shown diagrammatically in FIG. 1C by the plurality of arrows L (FIG. 1C being otherwise identical in FIG. 1A and the same numerical references denoting the same elements therein). Of course, if necessary, it can be envisaged that the means for distribution by capillarity of a liquid lubricant are arranged with all the contact areas of at least one satellite roller 7 respectively with the central rod 1 and the outer ring 4 in order to distribute the liquid lubricant.

Specific embodiments of means for distribution such as those mentioned in the various configurations above are given hereinafter.

The problem of sufficient and homogenous lubrication arises not only with respect to the length of contact of the satellite rollers 7 respectively with the central rod 1 and the outer ring 4, but also with respect to the annular development of the external surface 2 of the central rod 1 and the internal surface 6 of the outer ring 4, in the knowledge that in certain operating conditions the movements of the actuator may not extend over a full rotation, or even may not exceed a few degrees of angular amplitude. Thus it is entirely desirable to design the actuator, from the above standpoint, in relation to the operating modes for which it is intended.

Figure 2A:
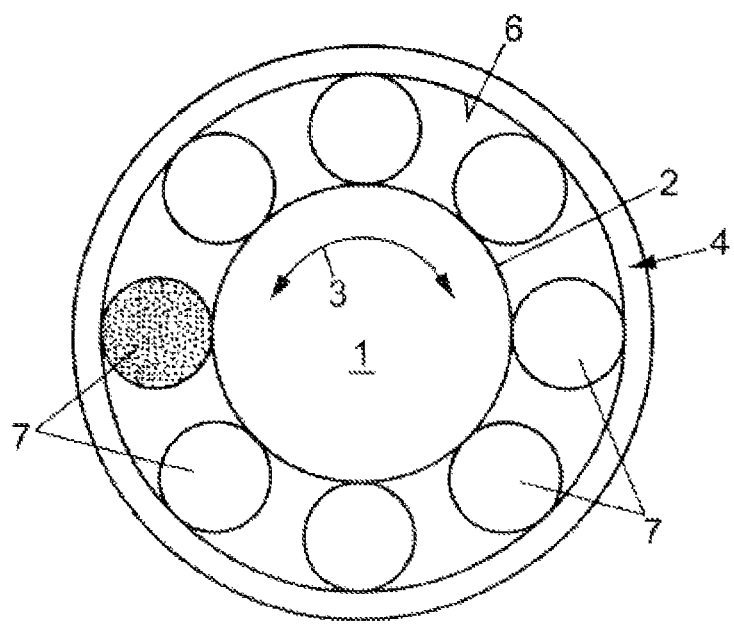
FIGS. 2A to 2C are simplified cross-sectional views of the actuator in FIGS. 1A to 1C in which a further fundamental aspect of the provisions of the invention has been highlighted respectively in three examples of different configurations, these figures moreover showing in simplified form three variants of a first embodiment of the provisions of the invention.
Figure 2B:
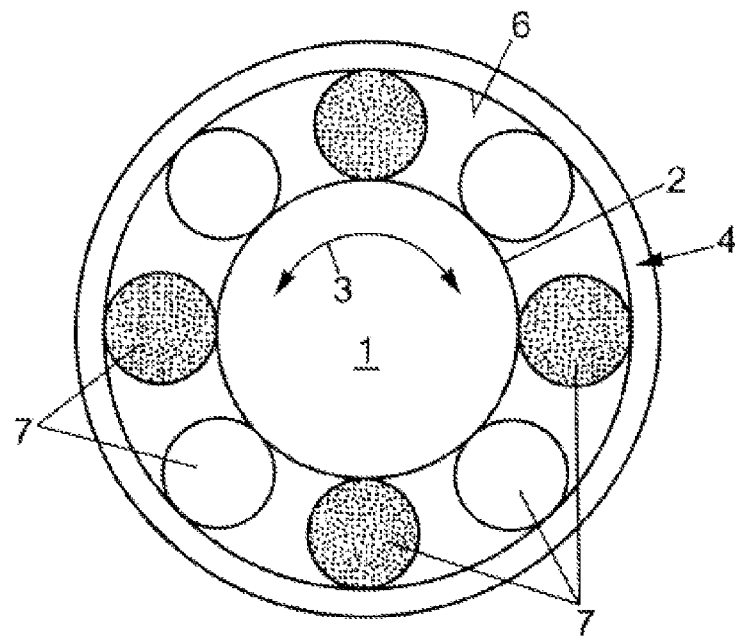

As shown very diagrammatically in FIG. 2A, the means for distribution by capillarity of a liquid lubricant can be functionally associated with a single satellite roller 7 (shaded grey) if the lubricant feed capacity during operation of the actuator is sufficient (for example, consistent maximum strokes).

Where such an arrangement is likely to prove insufficient in order to provide satisfactory lubrication, it can perfectly well be envisaged that the means for distribution by capillarity of a liquid lubricant are functionally associated with several satellite rollers 7 (shaded grey), in particular symmetrically distributed, as shown very diagrammatically in FIG. 2B for a configuration of four diametrically opposed paired satellite rollers from an assembly of eight satellite rollers 7.

Figure 2C:
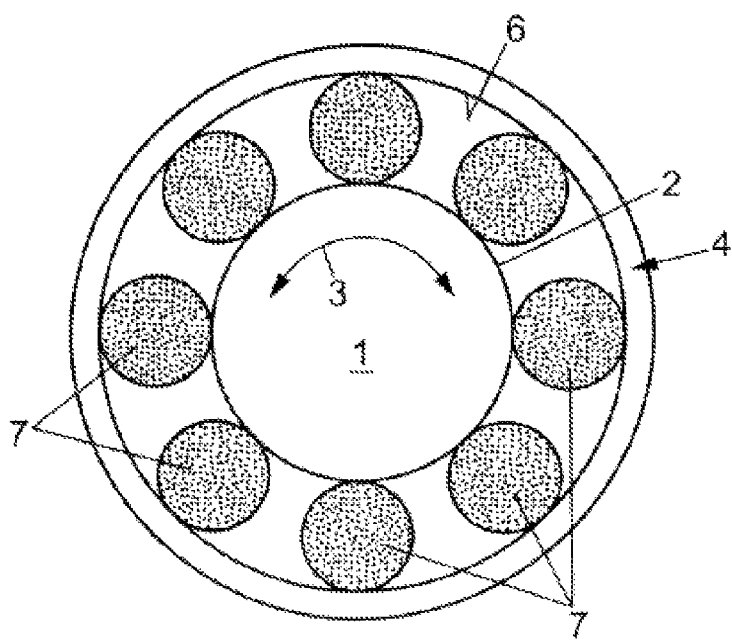

If necessary, it can perfectly well be envisaged that the means for distribution by capillarity of a liquid lubricant are functionally associated with all the satellite rollers 7 (shaded grey), as shown very diagrammatically in FIG. 2C.

In the context of the arrangement that has just been described, various embodiments can be provided.

A first embodiment can consist in that the means for distribution by capillarity of a liquid lubricant are incorporated into at least one satellite roller 7, in other words it is the, or each, satellite roller 7 that is arranged in order to dispense the liquid lubricant. Examples of such arrangements will be given below. Thus, if it proves sufficient in the context of certain operating conditions of the actuator, a single satellite roller 7 is arranged in order to dispense the liquid lubricant (the illustration in FIG. 2A can also be considered as illustrating this embodiment). Conversely, if more and better distributed lubrication is required, provision can be made for the means for distribution by capillarity of a liquid lubricant to be incorporated into several satellite rollers 7, in particular distributed symmetrically (the illustration in FIG. 2B can also be considered as illustrating this embodiment), or even if necessary for the means for distribution by capillarity of a liquid lubricant to be incorporated into all the satellite rollers 7 (the illustration in FIG. 2C can also be considered as illustrating this embodiment).

Figure 3A:
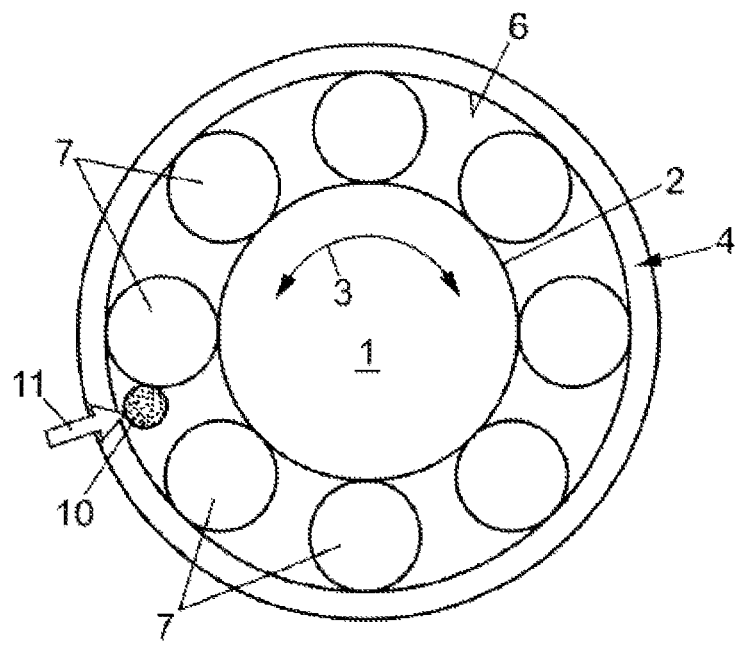
FIGS. 3A to 3E show in simplified form different variants of a second embodiment of the provisions of the invention.

In a second embodiment, provision is made, as shown very diagrammatically in FIG. 3A, for the means for distribution by capillarity of a liquid lubricant to be incorporated into at least one auxiliary roller 10 in contact with at least one satellite roller 7, while being radially arranged externally to the latter. Flexible retaining means 11 (here shown diagrammatically by an arrow directed substantially radially toward the centre) are provided in order to bias said auxiliary roller 10 substantially radially inward in contact with said satellite roller 7. It must be emphasized that the biasing force due to the means 11 must be only just sufficient for the auxiliary roller 10 to remain in contact with the satellite roller(s) with which it cooperates and that the auxiliary roller 10 must not be forcibly pressed against the interacting satellite roller(s) in order to avoid generating friction or any additional resisting force. Such an arrangement results in automatic clearance compensation and makes it possible to keep the auxiliary roller in contact with the interacting satellite roller(s) whatever the level of wear of the latter.

For the same reasons as those stated above, a single auxiliary roller 10 can be used if such an arrangement is sufficient for the result sought, as shown in FIG. 3A in which the auxiliary roller 10 is in contact with a single satellite roller 7.

Figure 3B:
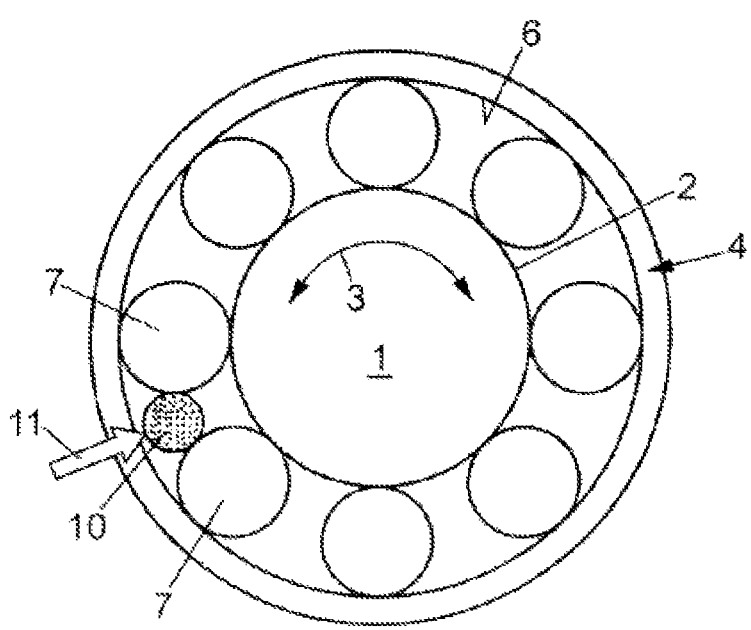

However, it is preferable to use an arrangement that is better balanced from the standpoint of the distribution of forces and which remains simple to implement. In this arrangement, shown very diagrammatically in FIG. 3B, the (or each) auxiliary roller 10 is in contact simultaneously with two adjacent satellite rollers 7, while being radially arranged externally thereto, and the flexible biasing means 11 are provided in order to bias said auxiliary roller 10 substantially radially inward in contact with the two adjacent satellite rollers 7.

Figure 3C:
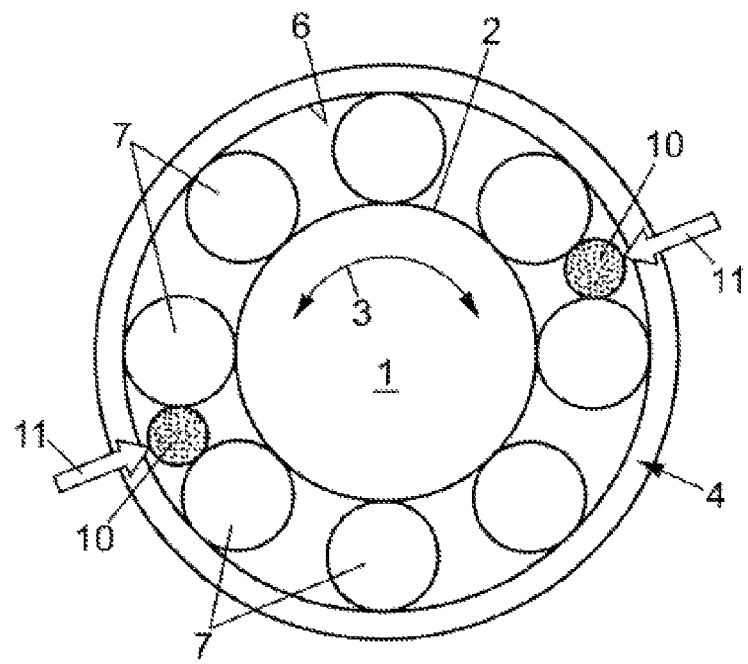

If the lubrication obtained with a single auxiliary roller proves insufficient, several auxiliary rollers 10 are then provided, in particular symmetrically distributed. This arrangement is illustrated very diagrammatically, in the context in which each auxiliary roller is in contact with two adjacent satellite rollers 7, in FIG. 3C with a configuration having two substantially diametrically opposed satellite rollers 10 and in FIG. 3D with a configuration having four substantially diametrically opposed paired satellite rollers 10.

Figure 3D:
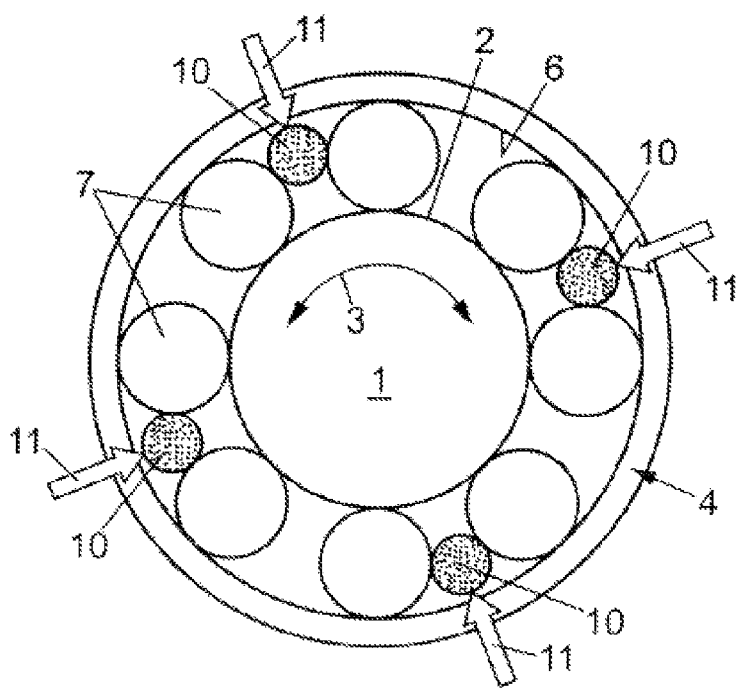

In a preferred embodiment, there is an even number of satellite rollers 7 and an auxiliary roller 10 functionally associated with each pair of satellite rollers 7 is provided. Thus, a first possibility can consist in that each satellite roller 7 is in contact with a single auxiliary roller 10 (in other words, an auxiliary roller 10 is only arranged in one gap out of two between satellite rollers 7) as shown in FIG. 3D—which leads to half the number of auxiliary rollers 10 compared to the number of satellite rollers 7—. A further possibility, if it proves necessary in order to obtain more lubrication, can consist in that an auxiliary roller 10 is arranged in each gap between two adjacent satellite rollers 7, each satellite roller 7 being lubricated by two flanking auxiliary rollers 10 (in other words, there are equal numbers of satellite rollers 7 and auxiliary rollers 10) as shown in FIG. 3E: the quantity of lubricant stored is then maximum.

Figure 3E:
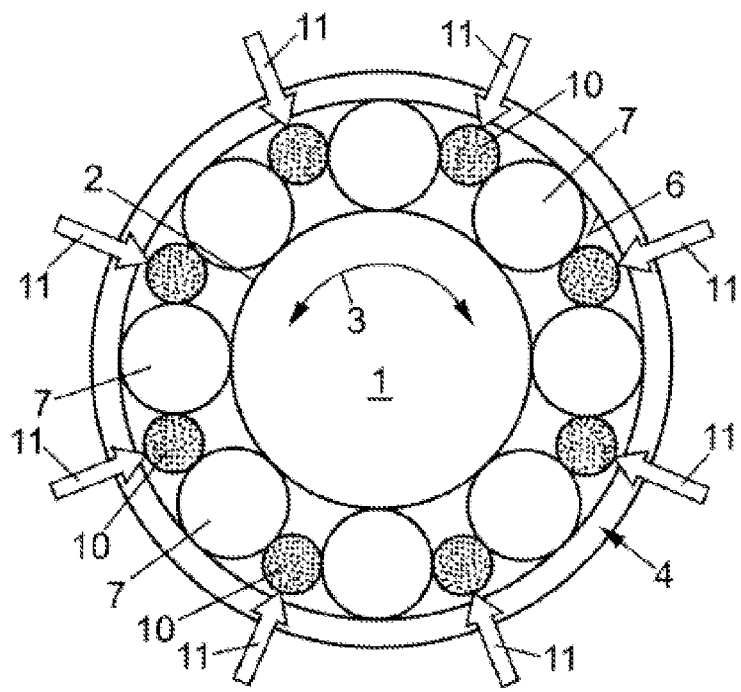
Figure 4A:
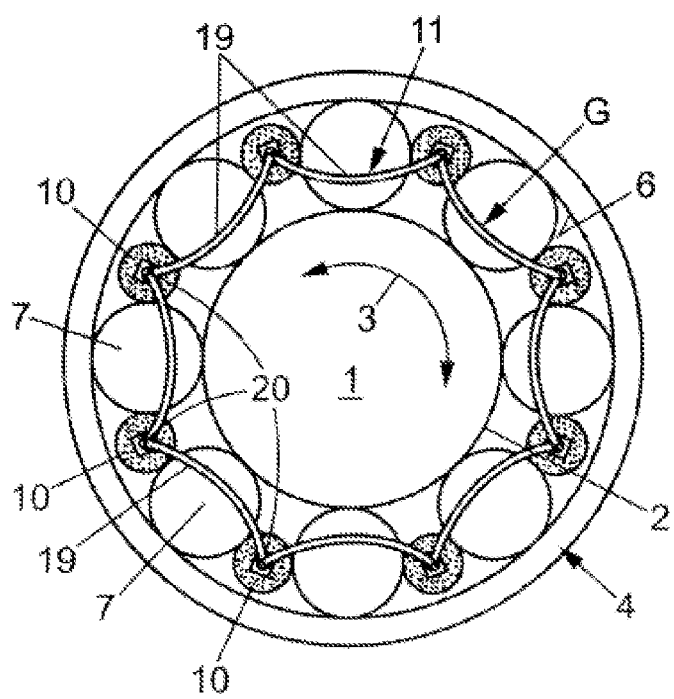
FIGS. 4A to 4C show in simplified form practical embodiments of means of holding the auxiliary rollers in the specific case of the variant in FIG. 3E, FIGS. 4B and 4C being respectively two cross-sections (the outer ring being omitted) along the lines B-B and C-C respectively in FIG. 7.

For the purpose of clarity, FIG. 4A shows a possible embodiment of the abovementioned flexible biasing means 11, implemented in the configuration shown in FIG. 3E. The means 11 are here constituted, at the two ends of the auxiliary rollers 10, by a set of curved arms 19, constituted from an elastically deformable material, which joins pierced flanges 20 in which the ends of the shafts of the auxiliary rollers 10 turn. The assembly thus presents the general appearance of an elastically deformable festoon G acting to pull each auxiliary roller into contact with the two satellite rollers 7 with which it cooperates.

Figure 4B:
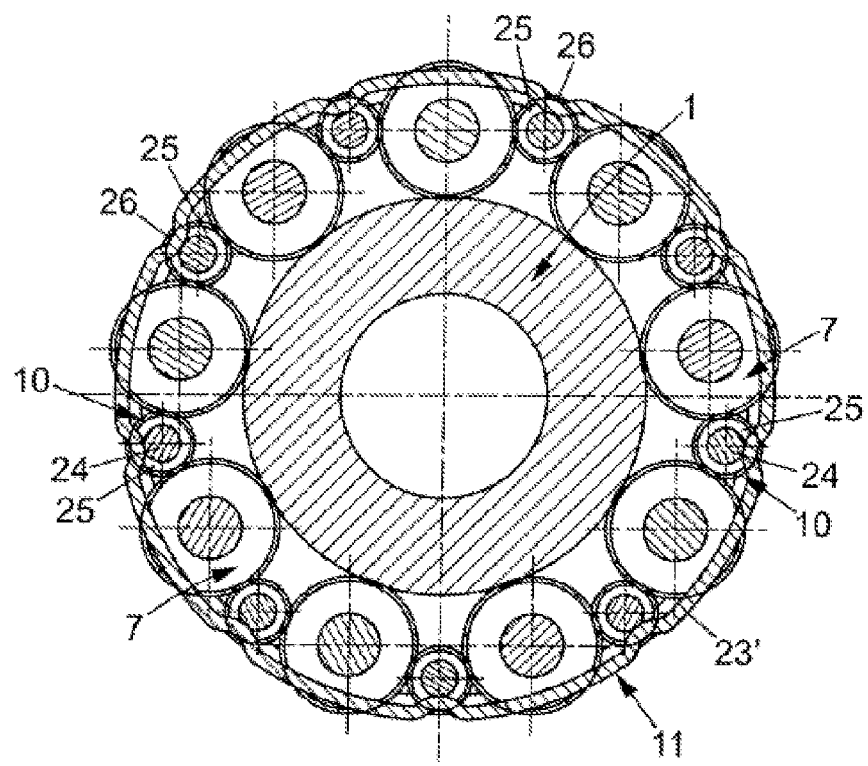

FIG. 4B and FIG. 7 (right-hand part) show a simple arrangement that is inexpensive to produce and to implement, according to which the flexible biasing means 11 comprise at least one ring 23' (in practice two rings 23' arranged at the two ends of the actuator), having a substantially circular shape, which is elastically deformable in particular radially and which surrounds all of the ends 24 of the auxiliary rollers 10 while flexibly pressing against them. In order to retain the ring 23', the ends 24 of the auxiliary rollers 10 are equipped with an annular groove 25 in which the ring 23' is engaged. The elasticity of the ring 23' can result from the natural elasticity of its constituent material, and/or from a specific shape facilitating the deformation, in particular radial, of the ring. By way of example, the ring 23' shown in FIGS. 4B and 7 (right-hand part) is provided with hollow recesses 26 having radially inward convexity, the number of these hollow recesses 26 being equal to the number of the auxiliary rollers 10 and each hollow recess 26 pressing by its convex face against the bottom of a groove 25 in one end 24 of an auxiliary roller 10.

Figure 4C:
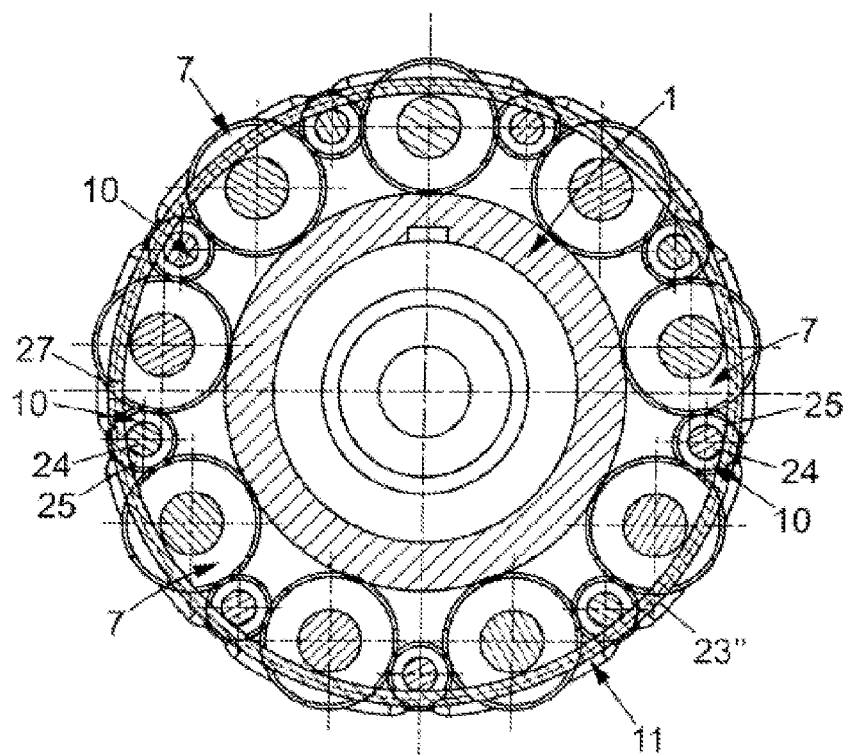

FIG. 4C and FIG. 7 (left-hand part) show an arrangement similar to that which has just been disclosed with regard to FIGS. 4B and 7 (right-hand part) and which also calls for a ring (in practice two rings arranged at the two ends of the actuator) which surrounds all of the ends 24 of the auxiliary rollers 10 while elastically pressing against them, with the exception that here the ring 23", which can have a substantially circular shape, is a split ring, the split 27 being visible in FIG. 4C.

It will have been understood from the above explanations that the function of storing and distributing the liquid lubricant can be assigned to one or more satellite rollers 7 and/or to one or more auxiliary rollers 10, it being possible to envisage a combination of specifically adapted satellite rollers and specifically adapted auxiliary rollers.

In order to ensure its suitability for these functions, the satellite and/or auxiliary roller in question can be arranged according to one of the following two technical solutions.

Figure 5A:
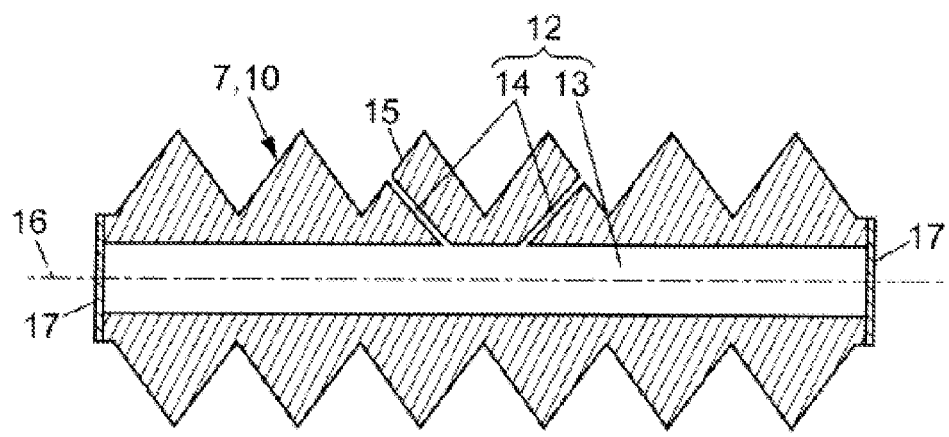
FIGS. 5A to 5C show in simplified form three variants of a first embodiment of a roller that can be used in a actuator with satellite rollers in order to dispense a liquid lubricant according to the invention.
Figure 5B:
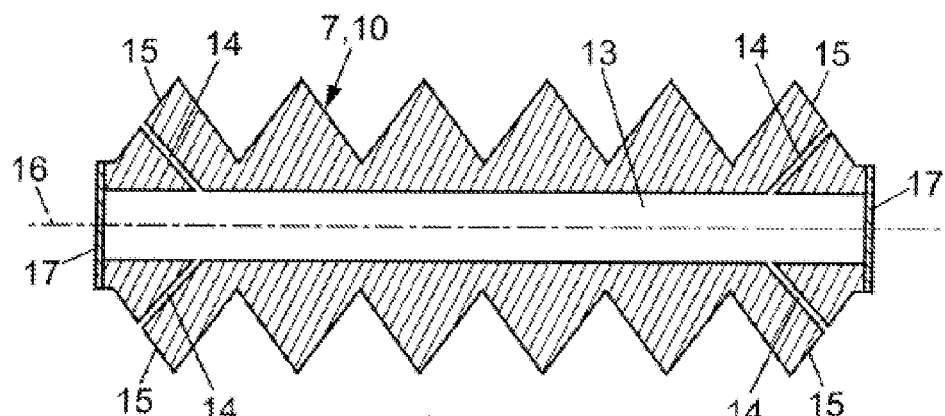
Figure 5C:
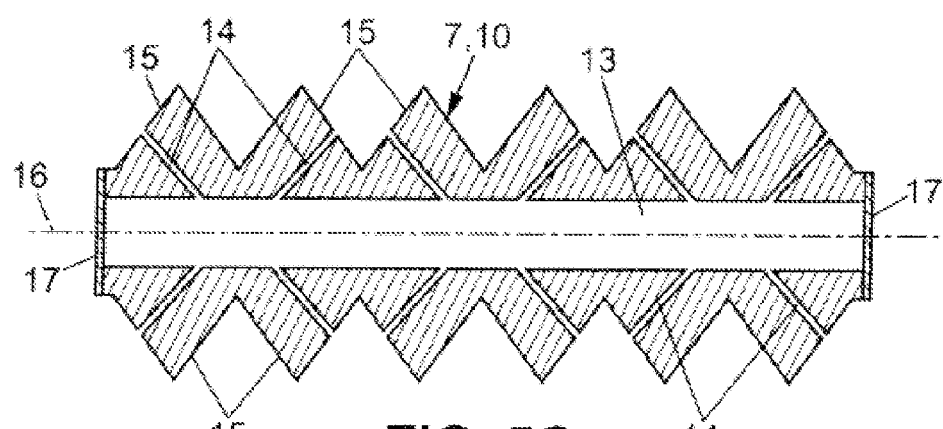

According to the first proposed solution, the roller 7 and/or 10 is arranged so that the means for distribution by capillarity of a liquid lubricant comprise a macroscopic reservoir 12 within said roller, as shown very diagrammatically in FIGS. 5A to 5C. Thus, the reservoir 12 comprises at least one inner cavity 13, in particular having an elongated shape parallel to the axis of the roller and preferably substantially coaxial to the axis 16 of said roller 7, 10; moreover, the reservoir 12 comprises at least one capillary channel 14 that extends, in particular approximately transversally to the axis 16, from said cavity 13 and opens onto at least one thread flank 15 of the roller. In practice, the cavity 13 is obtained by hollowing out the centre of the roller 7, 10 over the whole of its length and preferably coaxially to its axis 16, then by closing the end or the two ends with caps 17, as shown in FIGS. 5A to 5C.

The number and location of the capillary channel or channels 14 are determined in relation to the methods chosen for the distribution of the liquid lubricant. In the case where the pitch of the screw thread requires several threads, preferably as many channels must be provided as there are threads.

For distribution of lubricant in a central area of the roller as suggested above in relation to FIG. 1A, one or more capillary channels 14 are provided toward the middle of the roller such as shown diagrammatically in FIG. 5A; in this example, two capillary channels 14 are provided oriented in order to open onto two flanks 15 facing each other in order to lubricate the two facing thread flanks of the central rod 1 and the two facing thread flanks of the outer ring 4.

FIG. 7 shows, in diametrical section, a specific example of an actuator arranged in the manner that has just been disclosed with reference to FIG. 5A, and in combination with the provisions described with reference to FIGS. 3E, 4B (right-hand part) and 4C (left-hand part), it being emphasized that only the central rod 1, the satellite rollers 7, the auxiliary rollers 10, and the two flexible rings 23' (in the right-hand part) and 23" (in the left-hand part) are shown, while the outer ring 4 is not shown in order to leave the abovementioned underlying elements in view. As shown in FIG. 7, each auxiliary roller 10 is formed by a metal section 28 the centre of which is hollowed out by the abovementioned coaxial cavity 13 pierced from one end (right-hand end on the drawing), the other end being blind. The two capillary channels 14 are arranged approximately in a central position. The blind end 24 (on the left of the drawing) is equipped with the abovementioned annular groove 25 in which the flexible ring is engaged (split ring 23" in this embodiment). The opposite end from which the cavity 13 was machined is closed by a cap 29 that forms the abovementioned other end 24, which is configured (either alone or in conjunction with the end of the section 28) in order to define the abovementioned groove 25 in which the flexible ring (23' in this embodiment) is engaged.

In the example in FIG. 5B, a capillary channel 14 or several capillary channels 14 (here two capillary channels 14 opening onto thread flanks facing each other) are provided at each end of the roller 7, 10 so as to provide lubrication from the two ends of said roller as suggested above in relation to FIG. 1B. For significant and even distribution of lubricant over the whole length of the roller 7, 10 as suggested above in relation to FIG. 1C, a plurality of capillary channels 14 can be provided, distributed over the whole length of the roller 7, 10 and preferably arranged so as to open onto several thread flanks 15 facing each other as shown in FIG. 5C, or even opening onto all of the thread flanks of the roller.

Of course, it can perfectly well be envisaged that not all the capillary channels 14 are arranged in a single diametrical plane as the illustrations in FIGS. 5A to 5C would suggest, but are mutually angularly offset in order to open onto the thread flanks 15 in all transverse directions about the axis 16.

Figure 6A:
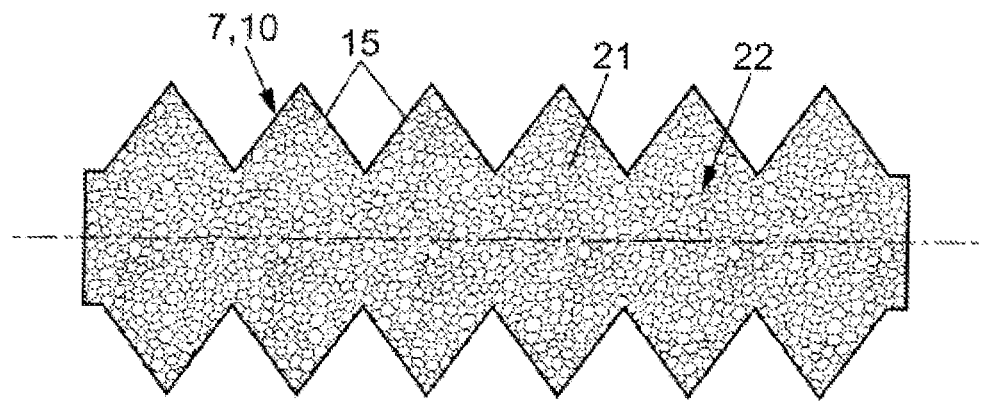
FIGS. 6A to 6B show in simplified form two variants of a second embodiment of a roller that can be used in a actuator with satellite rollers in order to dispense a liquid lubricant according to the invention.

According to the second proposed solution, the roller 7 and/or 10 is arranged so that the means for distribution by capillarity of a liquid lubricant comprise a capillary reservoir 22 within the roller formed by all of the pores of a very porous material 21 having open pores which constitutes said roller or at least a superficial part of said roller. In other words, it is the roller 7, 10 itself which, by the porous nature of its constituent material 21, forms the reservoir 22 of liquid lubricant as shown very diagrammatically in FIG. 6A and the lubricant is then distributed from microcavities opening onto the surface. Such an arrangement is suitable for continuous and even delivery of liquid lubricant over the whole length of the roller.

It must however be noted that, if the forces to be transmitted by the actuator are high, producing one or more satellite rollers in such a porous material is unsuitable due to the relatively low mechanical strength of porous materials; the arrangement proposed above will therefore be restricted a priori to the auxiliary rollers 10, which do not transmit any force.

Suitable porous materials for an application of this type are already known, for example for constituting porous cages for balls in ball bearings.

Figure 6B:
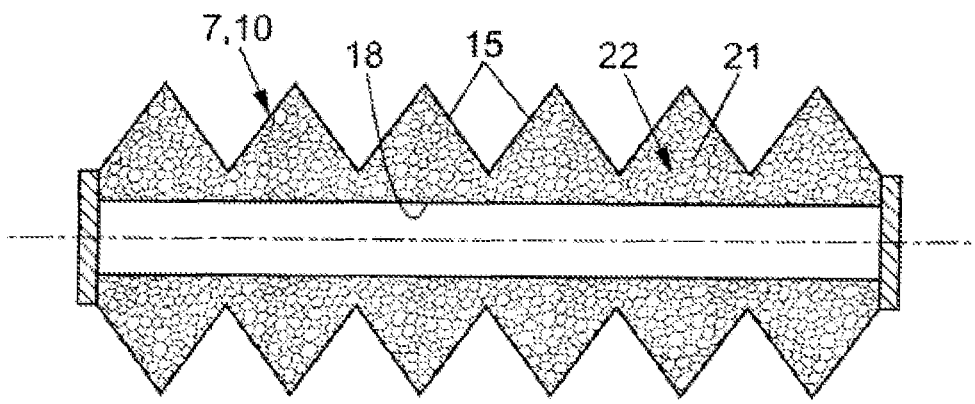

Optionally, if the capacity of the liquid lubricant store provided by all of the pores is insufficient, it can be envisaged, as shown in FIG. 6B, to produce an inner cavity 18 that serves as a main reservoir from which the liquid lubricant can migrate from pore to pore until it reaches the thread flanks 15.

For easy and reliable implementation of the provisions according to the invention, the lubricant used must have a viscosity compatible with the dimensions of the cavities or the capillary distribution channels, so that the distribution of said lubricant can be carried out by capillarity according to the invention. Preferably in this context, the liquid lubricant can be an oil with a diluted additive (for example, but not limitatively, molybdenum dithiocarbamate) capable of being distributed by capillarity, in such a way that the lubricant does not contain any solid particles likely to block the capillaries or the distribution pores. However, if necessary, it would also be possible to use a lubricant containing a solid additive in the form of particles, provided that the size of said particles is substantially smaller than that of the cavities or capillary channels so that no obstruction thereof results.

The invention claimed is:
1. A rotolinear actuator of the type comprising:
a central rod having a threaded outer face,
an outer ring surrounding substantially coaxially said central rod and possessing a threaded inner face, and a plurality of threaded satellite rollers distributed circumferentially between said outer face of said central rod and said inner face of said outer ring and engaged with said threaded faces of said central rod and said outer ring, one of said central rod and said outer ring being capable of rotating and axially secured while the other, respectively said outer ring or said central rod is secured in rotation and capable of being axially displaced, wherein the actuator comprises at least one auxiliary roller in contact with at least one satellite roller for distribution by capillarity of a lubricant liquid at least one contact area of said at least one satellite roller with said central rod and said outer ring, said at least one auxiliary roller having a diameter lower than the diameter of said satellite rollers, said lubricant being distributed by capillarity from a store; said auxiliary roller being neither in contact with said central rod nor with said outer ring wherein at least one of said satellite rollers and at least one auxiliary roller arranged in contact with at least one satellite roller is constituted of a porous material comprising a capillary reservoir formed by pores of said porous material.

2. The actuator according to claim 1, wherein said auxiliary roller is provided in order to distribute said lubricant at all said contact areas of at least one satellite roller with said central rod and said outer ring.

3. The actuator according to claim 1, wherein said auxiliary roller is functionally associated with a plurality of satellite rollers.

4. The actuator according to claim 1, wherein said auxiliary roller is functionally associated with all said satellite rollers.

5. The actuator according to claim 1, wherein flexible biasing means are provided in order to bias said at least one auxiliary roller substantially radially inward in contact with said at least one satellite roller.

6. The actuator according to claim 5, wherein at least one end of said at least one satellite roller is equipped with an annular groove; said flexible ring being engaged in said annular groove.

7. The actuator according to claim 5, wherein said at least one auxiliary roller is arranged in contact simultaneously with two adjacent satellite rollers, while being radially external thereto, and in that the flexible biasing means are provided in order to bias at least one said auxiliary roller substantially radially inward in contact with said two adjacent satellite rollers.

8. The actuator according to claim 7, wherein said satellite rollers are equal in number to the number of auxiliary rollers, each of said auxiliary rollers being functionally associated with a respective pair of satellite rollers.

9. The actuator according to claim 8, wherein said flexible biasing means provided in order to bias said auxiliary rollers substantially radially inward in contact with said satellite rollers comprise at least one flexible ring surrounding all of said auxiliary rollers and pressing flexibly against them.

10. The actuator according to claim 8 wherein said flexible biasing means provided in order to bias said auxiliary rollers substantially radially inward in contact with said satellite rollers comprise at least one split flexible ring surrounding all of said auxiliary rollers and flexibly pressing against them.

11. The actuator according to claim 1 wherein said lubricant is an oil with a diluted additive suitable for dispensing by capillarity.

12. The actuator according to claim 1, wherein said central rod is capable of rotating and axially secured and said outer ring is capable of being axially displaced and secured in rotation.

13. The actuator according to claim 1 wherein said outer ring is capable of rotating and axially secured and said central rod is capable of being axially displaced and secured in rotation.

* * * * *